United States Patent
Van Berkel et al.

(10) Patent No.: US 6,663,999 B2
(45) Date of Patent: Dec. 16, 2003

(54) METHOD OF FABRICATING AN ASSEMBLY COMPRISING AN ANODE-SUPPORTED ELECTROLYTE, AND CERAMIC CELL COMPRISING SUCH AN ASSEMBLY

(75) Inventors: Franciscus Petrus Felix Van Berkel, Alkmaar (NL); Jan Pieter Ouweltjes, Sint Pancras (NL); Pieter Nammensma, Heerhugowaard (NL)

(73) Assignee: Stichting Energieonderzoek Centrum Nederland, Petten (NL)

(*) Notice: Subject to any disclaimer, the term of this patent is extended or adjusted under 35 U.S.C. 154(b) by 0 days.

(21) Appl. No.: 10/203,003

(22) PCT Filed: Feb. 5, 2001

(86) PCT No.: PCT/NL01/00085
§ 371 (c)(1),
(2), (4) Date: Aug. 5, 2002

(87) PCT Pub. No.: WO01/57945
PCT Pub. Date: Aug. 9, 2001

(65) Prior Publication Data
US 2003/0012880 A1 Jan. 16, 2003

(30) Foreign Application Priority Data
Feb. 4, 2000 (NL) .............................................. 1014284

(51) Int. Cl.[7] .......................... H01M 4/96; H01M 4/88; B05D 5/12
(52) U.S. Cl. .............................. 429/45; 429/40; 429/44; 427/115; 427/123; 427/126.3; 427/282; 427/383.1; 502/101
(58) Field of Search ................................ 427/115, 123, 427/126.3, 282, 383.1; 502/101; 429/40, 44, 45

(56) References Cited

U.S. PATENT DOCUMENTS

| | | | |
|---|---|---|---|
| 5,122,425 A | * | 6/1992 | Yoshida et al. ................ 429/33 |
| 5,445,903 A | | 8/1995 | Cable et al. |
| 5,629,103 A | * | 5/1997 | Wersing et al. ................ 429/33 |
| 5,676,806 A | * | 10/1997 | Van Berkel et al. ........ 204/242 |
| 5,932,368 A | | 8/1999 | Batawi et al. |
| 6,007,683 A | | 12/1999 | Jankowski et al. |
| 6,228,521 B1 | * | 5/2001 | Kim et al. ..................... 429/33 |

FOREIGN PATENT DOCUMENTS

| | | |
|---|---|---|
| DE | 41 32 584 | 4/1992 |
| DE | 198 19 453 | 11/1999 |
| JP | 06 349503 | 12/1994 |
| WO | 97 23007 | 6/1997 |
| WO | 99 16140 | 4/1999 |
| WO | 00 69008 | 11/2000 |

OTHER PUBLICATIONS

Jorgensen et al., "Fabrication of thin anode–supported SOFC's", Fourth European Solid Oxide Fuel Cell Forum. Proceedings, Lucern, Switzerland Jul. 10–14, 2000, pp. 203–210, vol. 1, 2000.

* cited by examiner

Primary Examiner—Brian K. Talbot
(74) Attorney, Agent, or Firm—Young & Thompson

(57) ABSTRACT

Electrochemical cell on the basis of electrode-supported thin electrolyte includes an anodic support (1) consisting of a nickel/zirconia material and an electrolyte layer (3) disposed that includes zirconia thereon and a cathode layer (6) which is in turn disposed thereon. To improve the quality of the cell and to increase the output it is proposed to arrange an auxiliary or intermediate layer (2) between the electrolyte layer and the anodic support. This auxiliary layer consists of nickel and zirconia particles which are substantially smaller than the particles of the support. Then an electrolyte layer (10) and, on the other side of the anodic support, a current collector layer are applied. None of these layers are sintered. Only after an assembly obtained in this manner has been obtained is a sintering treatment carried out.

15 Claims, 1 Drawing Sheet

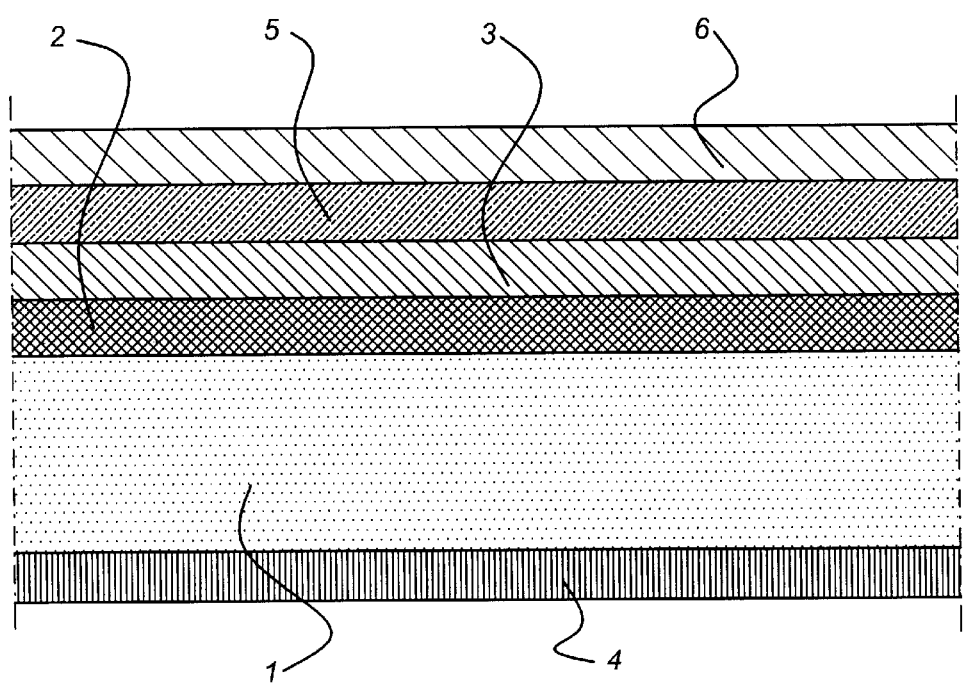

METHOD OF FABRICATING AN ASSEMBLY COMPRISING AN ANODE-SUPPORTED ELECTROLYTE, AND CERAMIC CELL COMPRISING SUCH AN ASSEMBLY

The present invention relates to a method of fabricating an electrode support, comprising the steps of providing an assembly comprising an anodic support made of nickel/zirconia material, of applying to one side of that anodic support an anode auxiliary layer comprising a mixture of nickel oxide and YSZ particles on top of which an electrolyte layer comprising YSZ particles is applied.

Such a support is disclosed by DE-19819453 A1. There, an auxiliary layer is applied to a sintered anode support, and after a prior heat treatment an electrolyte layer is put onto the auxiliary layer. The assembly consisting of anode support, auxiliary layer and electrolyte layer is then sintered at 1400° C. A cathode is then applied and a further sintering treatment is carried out.

It is the object of the present invention to provide a method which incorporates the step of applying a current collector layer disposed on the other side of the anode support.

With a prior art method, sintering of the anode support and application of an auxiliary layer and/or electrolyte layer after this has been sintered is followed by the application of a current collector layer, after which the assembly is subjected to yet another sintering operation.

It has been found that the output of an electrochemical cell comprising such an assembly is not optimal, and it is the object of the present invention to improve the output of such a cell and its reliability. This object is achieved for an above-described method in that the step of providing the assembly is followed by subjecting said assembly to a sintering treatment, the anodic support and the various layers and/or combinations thereof of the assembly being in a nonsintered state prior to said sintering treatment.

It is assumed that the inventively improved characteristics of an electrochemical cell fabricated with the assembly according to the invention are achieved because none of the layers of which the assembly is composed has been subjected to a sintering treatment before the sintering treatment of the entire assembly is carried out. In particular, this allows the so-called sintering shrinkage to be avoided, i.e. the shrinkage which results in prior-art assemblies from repeated sintering of specific layers and one-off sintering of other layers disposed thereon. Moreover, the number of sintering steps is decreased, thereby reducing production costs. According to an advantageous embodiment of the invention, the current collector layer is also applied before the assembly is sintered and is sintered together with the assembly.

According to the invention, the above-described sintering treatment preferably takes place at a temperature of between 1300 and 1500° C.

To impart some strength to the anodic, preferably nonsintered, support, it is possible, according to the invention, to subject this to a heat treatment at a temperature of between 900 and 1100° C., the details depending on the materials used and technical possibilities. That is to say that in principle it is possible to dispense with such a prior heat treatment of the anodic support.

Apart from the above-described layers, the assembly can moreover comprise a cathode layer and/or additional electrolyte layer or electrolyte auxiliary layer, respectively.

The above-described assembly allows the operating temperature of a solid oxide fuel cell to be further reduced. At present, a temperature range of 700–800° C. is considered desirable. This low temperature allows the stack and system components of the cell to be constructed more cheaply. That is to say, the steel grades used can be less expensive ferritic stainless grades. Moreover, components customary for installations in the prior art can be employed, and the service life of the various components and consequently of the cell can be extended considerably.

However it has been found that at a low operating temperature the efficiency of the solid oxide fuel cell decreases. The reason for this is that the voltage losses across the cell increase with falling temperature. In the prior art it has been proposed to reduce the thickness of the electrolyte to values below 40 $\mu$m, as a result of which the voltage losses across the ceramic cell decrease and lower operating temperatures can be achieved. As thin electrolyte layers of this type have negligible mechanical strength, electrode-supported solid oxide fuel cells have been proposed. In such an arrangement, an electrolyte material in the form of a thin layer is, for example, applied to an anodic support which has been sintered. The above-described publication describes such an anode-supported thin electrolyte layer. Starting from nickel oxide and YSZ (yttrium-stabilized zirconia), a suspension is prepared which is shaped as desired by uniaxial pressing, followed by sintering. The electrolyte layer is applied directly to the anode substrate thus prepared.

The application of an auxiliary or intermediate layer consisting of NiO/YSZ was found to result in filling of the larger pores of the anode substrate, thus producing a very flat surface of the anode support. This comparatively dense layer is comparatively thin, i.e. its effect on the diffusion of gases is comparatively small. The underlying thicker layer has greater porosity, which means that the movement of the gases is not hampered. That is to say that according to the invention a design is obtained which on the one hand has a very flat boundary without large cavities but on the other hand is sufficiently gas-permeable to permit migration of gases. According to an advantageous embodiment, the particle size chosen for the intermediate layer such that the surface of the anode support only has pores smaller than about 1 $\mu$m and a minimum of defects or even is free from defects. This allows the electrolyte to be applied under optimal conditions to the support with the auxiliary layer. The electrolyte is thus fabricated free from defects.

According to an advantageous embodiment of the invention, the mean diameter of the pores of the auxiliary layer is below 0.5 $\mu$m, while the underlying thicker support has pores having a mean diameter of between 0.5 and 3.0 $\mu$m.

The porosity of the auxiliary layer in particular is about 40 vol %, while the porosity of the support is between 40 and 60 vol %.

The anodic support is fabricated, for example, by a suspension being prepared, starting e.g. from nickel oxide and zirconia material, and this being given the desired (green) shape, for example by means of sheet casting or extrusion, and possibly some strength being imparted thereto by heat treatment in the anodic support. This heat treatment can be carried out in any manner known in the prior art, at a temperature of between 900 and 1100° C. over a period of from 1 to 8 hours. This treatment does not comprise any sintering. Sintering is carried out at a higher temperature.

Next, the anode auxiliary layer is applied. The technique of application to the anodic support can comprise any method known in the prior art. Since a comparatively thin layer has to be applied, the screen printing technique is particularly suitable. The layer thickness of the auxiliary layer can be between 3 and 20 $\mu$m. Next, a layer of YSZ of the same thickness can be applied which, after the heating step, acts as the electrolyte. Next, the assembly thus obtained can undergo a sintering treatment at a temperature of between 1300 and 1500° C. The sintering time can be about one hour. Then the cathode is embodied. Cosintering is an option. The invention moreover allows fabrication costs to be kept within limits and the production to be scaled up in a simple manner.

To improve the current collection on the anode side, a separate current collector is provided. This current collector can comprise nickel material. Such a current collector can be embodied by a nickel oxide layer having e.g. a layer thickness of 10–40 $\mu$m being applied to the anode before final sintering. During operation in an electrochemical reactor, nickel oxide will be converted into nickel. Apart from acting as a current collector, the nickel layer prevents nickel depletion from the anode support during final sintering. This is because at the comparatively high sintering temperature (1300–1500° C.) nickel oxide has been found to evaporate and to migrate towards the sintering plates between which sintering takes place. Placed against said current collector is a further current collector made of metallic material, such as a gauze or plate material. The sequence of the application of the various layers to the anode support can be modified as desired.

One example of the invention is illustrated in more detail with reference to the drawing. The single FIGURE shows an anode-supported electrolyte. The anode support is indicated by 1 and consists of a nickel/zirconia layer. The thickness of this layer is between 200 and 1000 $\mu$m. This layer serves to impart mechanical strength and should be readily gas-permeable. Moreover, because of its thickness it should lend itself to being fabricated in a comparatively inexpensive manner, for example by means of sheet casting or extrusion. Other metal-ceramic compositions are conceivable, copper and cobalt being potentially suitable as metals and titanium oxide, aluminium oxide and magnesium oxide being potentially suitable as ceramic materials. Optionally, a steam-methane reformer catalyst can be present, which converts steam and methane into carbon monoxide and hydrogen. 3 indicates the electrolyte layer, consisting of 8 YSZ. In general, the electrolyte should consist of oxygen ion-conducting ceramic materials such as ceria, zirconia and perovskites, which can be doped e.g. with lanthanide or alkaline earth metals. This layer 3 has a thickness of between 3 and 40 $\mu$m. The anode auxiliary or intermediate layer is indicated by 2. This consists of nickel and a ceramic material such as zirconia, ceria and the like. Here again, variations are possible, and in general a combination of a metal and oxygen ion-conducting ceramic will be used, consisting e.g. of lanthanide- or alkaline earth metal-doped ceria, zirconia or perovskites.

4 indicates a current collector layer. In the operational stage, this consists of nickel and has a thickness of between 4 and 40 $\mu$m.

The current collector preferably includes a contact layer made of some metal. If nickel is used, the evaporation of nickel oxide from the support layer 1, the anode support, during sintering will be inhibited.

Layer 5 is an additional electrolyte layer or electrolyte auxiliary layer which can be applied directly on top of electrolyte layer 3. This layer consists of lanthanide- or alkaline earth metal-doped ceria. The use of this additional electrolyte layer permits mixed-conductivity perovskite materials such as $La_{0.6}Sr_{0.4}Fe_{0.8}Co_{0.2}O_3$ to be employed which normally react with a zirconia electrolyte but do not react with a ceria electrolyte. Layer 5 can be sintered at 1300–1500° C. together with the anode support and the anode auxiliary layer and electrolyte layer disposed thereon and the current collector layer. Alternatively, this layer 5 can be sintered in a separate step after the assembly consisting of the anode support, anode auxiliary layer, electrolyte layer and current collector layer has been sintered. Layer 6 is the cathode layer, which can consist of a bilayer cathode, consisting of 1) a mixture layer of $(La,Sr)MnO_3$ (LSM) and zirconia on top of this, and 2) a current-collecting layer consisting of LSM if electrolyte layer 3 only is used. In the case of electrolyte layer 5 being used as well there is the option of employing mixed-conductivity perovskite materials such as $La_{0.6}Sr_{0.4}Fe_{0.8}Co_{0.2}O_3$ as the cathode material. Layer 6 can likewise be sintered directly with the above-described assembly and also, in a separate step, be sintered after the above-described assembly has been sintered. Those skilled in the art, having read the above, will immediately be able to think of variations which are obvious and are within the scope of the appended claims.

What is claimed is:

1. Method of fabricating an electrode support, comprising the steps of providing an assembly comprising an anodic support made of nickel/zirconia material, of applying to one side of that anodic support an anode auxiliary layer comprising a mixture of nickel oxide and YSZ particles on top of which an electrolyte layer comprising YSZ particles is applied, wherein in that the step of providing the assembly is followed by subjecting said assembly to a sintering treatment, the anodic support and the various layers and/or combinations thereof of the assembly being in a nonsintered state prior to said sintering treatment, characterised in that, said auxiliary layer is applied in a thickness of 3–20 $\mu$m by screen printing; a current collector layer being provided, which is disposed on the other side of the anodic support, including metal particles and in a nonsintered state prior to said sintering treatment, and wherein a nickel oxide layer having a thickness of 10–40 $\mu$m is applied to the inside of said anodic support.

2. Method according to claim 1, wherein said sintering treatment is carried out at a temperature of between 1300 and 1500° C.

3. Method according to claim 1, wherein the step of providing an anodic support comprises a heat treatment of said anodic support at 900–1100° C.

4. Method according to claim 1, wherein said assembly comprises a cathode layer.

5. Method according to claim 1, wherein said assembly comprises an electrolyte auxiliary layer disposed between electrolyte layer and cathode.

6. Method according to claim 1, wherein the step of providing the anodic support comprises the fabrication, by means of the tape casting technique or extrusion, of a plate having a thickness of between 0.3 and 1.0 mm.

7. Method according to claim 1, wherein said auxiliary layer is applied as a suspension to the support by means of screen printing.

8. Method according to claim 1, comprising a further electrolyte layer on said electrolyte layer which comprises YSZ particles and is cosintered therewith.

9. Method according to claim 8, wherein said further electrolyte layer comprises ceria doped with lanthanide or alkaline earth metals.

10. Method according to claim 1, wherein the pores of said auxiliary layer have a mean diameter of less than 0.5 $\mu$m.

11. Method according to claim 1, wherein the pores of said anodic support have a mean diameter of 0.5–0.3 μm.

12. Method according to claim 1, wherein the porosity of said auxiliary layer is about 40 vol %.

13. Method according to claim 1, wherein the porosity of said support is 40–60 vol %.

14. Method according to claim 1, wherein the current collector layer comprises nickel.

15. Electrochemical cell comprising an assembly obtained by means of the method according to claim 1.

* * * * *